US011763820B2

United States Patent
Wu et al.

(10) Patent No.: US 11,763,820 B2
(45) Date of Patent: Sep. 19, 2023

(54) MONITORING METHOD AND SYSTEM BASED ON MAGNETIC FIELD OF LOUDSPEAKER

(71) Applicant: SHENZHEN UNIVERSITY, Shenzhen (CN)

(72) Inventors: Kaishun Wu, Shenzhen (CN); Qianru Liao, Shenzhen (CN)

(73) Assignee: SHENZHEN UNIVERSITY, Shenzhen (CN)

(*) Notice: Subject to any disclaimer, the term of this patent is extended or adjusted under 35 U.S.C. 154(b) by 294 days.

(21) Appl. No.: 17/376,188

(22) Filed: Jul. 15, 2021

(65) Prior Publication Data
US 2022/0383875 A1 Dec. 1, 2022

(30) Foreign Application Priority Data
May 28, 2021 (CN) .......................... 202110591237.1

(51) Int. Cl.
*G10L 15/26* (2006.01)
*H04R 29/00* (2006.01)

(52) U.S. Cl.
CPC ............ *G10L 15/26* (2013.01); *H04R 29/001* (2013.01)

(58) Field of Classification Search
CPC ..... G10L 15/26; G10L 21/0208; G10L 19/26; H04R 29/001; H04R 1/1083

USPC ......................................... 704/235
See application file for complete search history.

(56) References Cited

U.S. PATENT DOCUMENTS

2018/0128888 A1* 5/2018 Ropella ................ H04R 1/1083

FOREIGN PATENT DOCUMENTS

CN 112055295 A * 12/2020 ............. G10L 19/26

* cited by examiner

*Primary Examiner* — Md S Elahee
(74) *Attorney, Agent, or Firm* — Bayramoglu Law Offices LLC (57) ABSTRACT

A monitoring method and system based on a magnetic field of a loudspeaker are provided. This method includes: collecting a magnetic field signal near the loudspeaker, and converting the magnetic field signal into a magnetic field digital signal; converting the magnetic field digital signal into a speech signal and removing an interference from the speech signal to obtain a filtered speech signal; removing noise in the speech signal, and performing short-time inverse Fourier transform on a speech power spectrum to obtain a denoised speech signal; equalizing response of the denoised speech signal to each frequency to convert the speech signal into an intelligible speech audio signal; and recognizing the speech audio signal and converting the same into a text content.

10 Claims, 7 Drawing Sheets

MONITORING METHOD AND SYSTEM BASED ON MAGNETIC FIELD OF LOUDSPEAKER

CROSS REFERENCES TO THE RELATED APPLICATIONS

This application is based upon and claims priority to Chinese Patent Application No. 2021105912371, filed on May 28, 2021, the entire contents of which are incorporated herein by reference.

TECHNICAL FIELD

The present disclosure relates to the field of information processing and intellisense technologies, and more particularly, to a monitoring method and system based on a magnetic field of a loudspeaker.

BACKGROUND

In recent years, with the increasing prosperity of information and communication technologies, various electronic devices have been widely used. These electronic devices can provide various services and enrich peoples' daily experiences. As important components, acoustic sensors (such as loudspeakers and microphones) are widely used in the electronic devices. It is predicted that micro loudspeakers on the market are expected to reach 15.61 billion by 2021. While enjoying high-quality services (such as VoIP, teleconferencing, and online infotainment) provided by the acoustic sensors, users also face the threat of privacy leakage. Although there have been many preventive measures, new monitoring technologies are still emerging.

The most advanced monitoring system has proven the feasibility of inferring sensitive user information by using various non-acoustic sensors (such as motion sensors and vibration motors) in smart mobile phones. However, this method requires attackers to install malicious software on the users' mobile phones to gain access to read sensor data. Device vendors or related organizations can control and impose restrictions on such hacking by deploying new policies. In addition, some studies have proposed the use of wireless vibration to monitor the loudspeakers, which can demodulate vibration signals of the loudspeakers from received RSS data of a WiFi packet, thereby recovering piano sounds and ten-digit sounds. However, the studies did not verify whether it can recover intelligible human speech at the sentence level. Furthermore, when the WiFi packet does not have a high enough transmission rate, the studies cannot recover audios from the loudspeakers of the smart mobile phones, which is particularly inapplicable for midget earphones.

SUMMARY

An objective of the present disclosure is to overcome the above defects of the existing technologies by providing a monitoring method and system based on a magnetic field of a loudspeaker.

According to a first aspect of the present disclosure, there is provided a monitoring method based on a magnetic field of a loudspeaker. This method includes following steps:

S1: collecting a magnetic field signal near the loudspeaker, and converting the magnetic field signal into a magnetic field digital signal;

S2: converting the magnetic field digital signal into a speech signal and removing an interference from the speech signal to obtain a filtered speech signal;

S3: removing noise in the speech signal, and performing short-time inverse Fourier transform on a speech power spectrum to obtain a denoised speech signal;

S4: equalizing response of the denoised speech signal to each frequency to convert the speech signal into an intelligible speech audio signal; and S5: recognizing the speech audio signal and converting the same into a text content.

According to a second aspect of the present disclosure, there is provided a monitoring system based on a magnetic field of a loudspeaker. The system includes:

a signal collecting module, configured to collect a magnetic field signal near the loudspeaker, and convert the magnetic field signal into a digital signal, the digital signal being transmitted to a computer for processing;

a signal preprocessing module, configured to convert the magnetic field digital signal into a speech signal and remove an interference from the speech signal to obtain a filtered speech signal;

a denoising module, configured to remove noise in the speech signal, and perform short-time inverse Fourier transform on a speech power spectrum to obtain a denoised speech signal;

an equalizing module, configured to equalize response of the denoised speech signal to each frequency to convert the speech signal into an intelligible speech audio signal; and a speech-to-text conversion module, configured to recognize the speech audio signal and convert the same into a text content.

Compared with the existing technologies, the present disclosure has advantages as below. The magnetic field signal from the loudspeaker is used for monitoring, and based on signal processing technologies, the monitoring method and system that can recover intelligible speech contents may be implemented. The monitoring method and system provided by the present disclosure may be used for legal monitoring, and the speech contents can be restored with higher accuracy even though when target loudspeakers are obstructed by concrete walls.

Other features and advantages of the present disclosure will become apparent from the following detailed description of exemplary embodiments of the present disclosure with reference to accompanying drawings.

BRIEF DESCRIPTION OF THE DRAWINGS

The accompanying drawings herein are incorporated in and constitute a part of this specification, illustrate embodiments of the present disclosure and, together with the specification, serve to explain the principles of the present disclosure.

DETAILED DESCRIPTION OF THE EMBODIMENTS

Various exemplary embodiments of the present disclosure will now be described in detail with reference to the accompanying drawings. It is to be noted that the relative arrangement, numerical expressions, and numerical values of the components and steps set forth in these embodiments do not limit the scope of the present disclosure unless otherwise specifically stated.

The following description of at least one exemplary embodiment is actually merely illustrative, and in no way serves as any limitation on the present disclosure and application or use thereof.

Technologies, methods and equipment known to those of ordinary skill in the related art may not be discussed in detail, but where appropriate, the technologies, methods and equipment should be considered as part of the specification.

In all examples shown and discussed herein, any specific values should be interpreted as merely exemplary and not limiting. Therefore, other examples of the exemplary embodiment may have different values.

It is to be noted that similar reference numerals and letters indicate similar items in the following accompanying drawings. Therefore, once an item is defined in one drawing, there is no need to discuss this item further in subsequent drawings.

Figure 1:
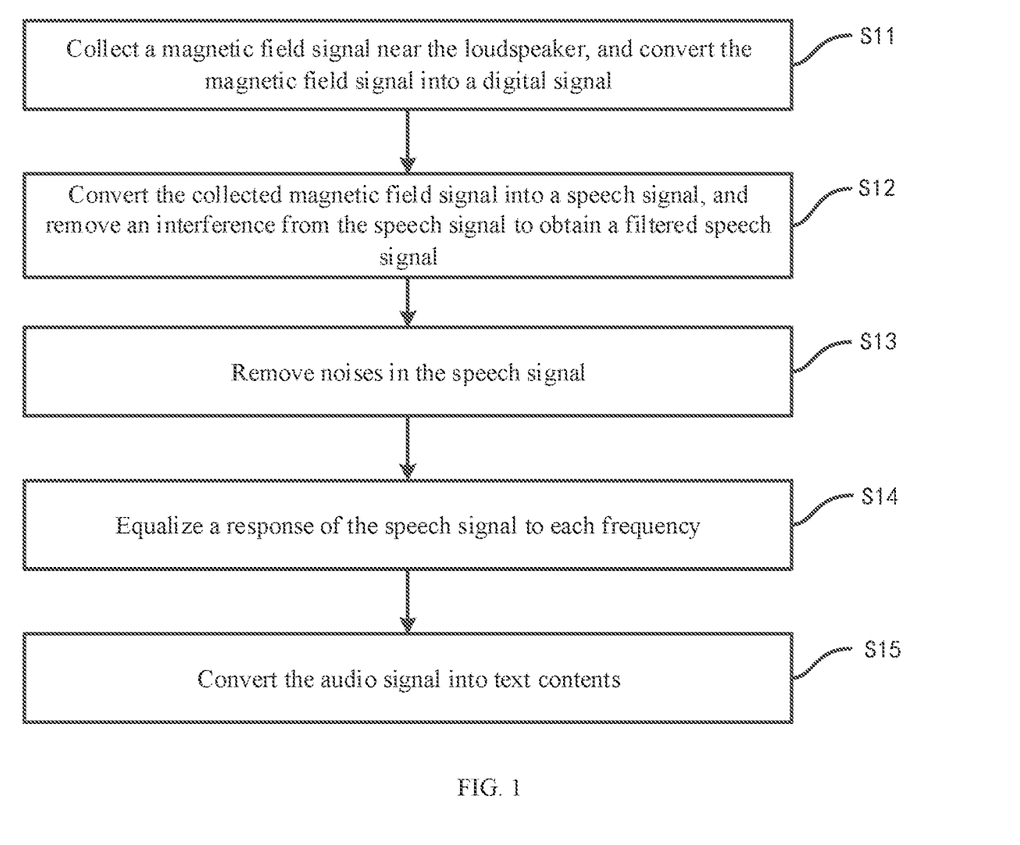
FIG. 1 is a flowchart of a monitoring method based on a magnetic field of a loudspeaker according to one embodiment of the present disclosure.

With reference to FIG. 1, a monitoring method based on a magnetic field of a loudspeaker includes following steps.

In Step S11, a magnetic field signal near the loudspeaker is collected, and the magnetic field signal is converted into a digital signal.

Figure 2:
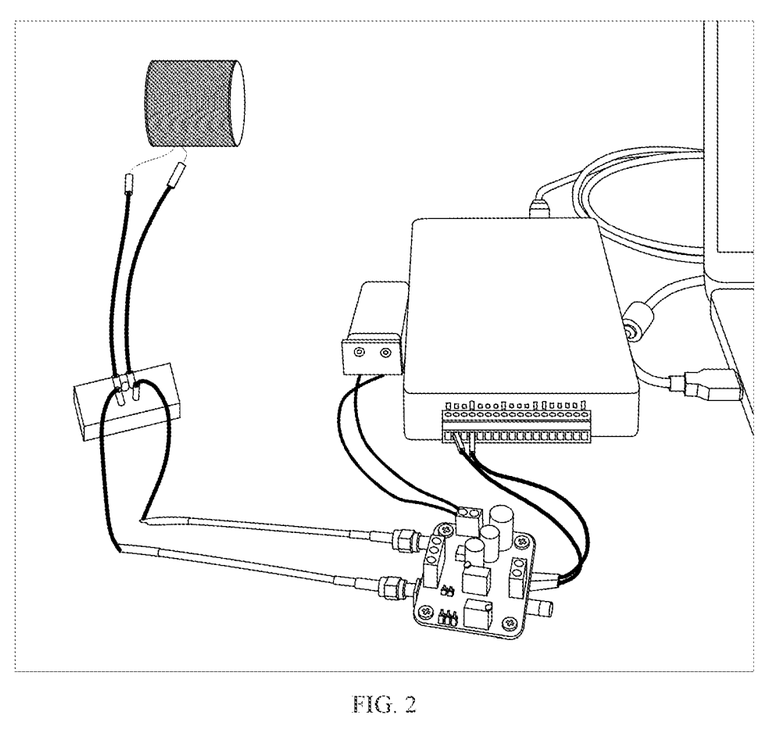
FIG. 2 is a schematic diagram illustrating a hardware structure of a monitoring method based on a magnetic field of a loudspeaker according to one embodiment of the present disclosure.

FIG. 2 is a hardware structure diagram of a signal collection apparatus, which includes a coil, a capacitor, an amplifier, and an analog-to-digital converter. The coil is connected in parallel to the capacitor, the coil is connected to the amplifier, the amplifier is connected to the analog-to-digital converter, and the analog-to-digital converter may be further connected to a computer or other signal processing devices.

Specifically, the coil (or other sensors that can collect the magnetic field signal) is made of an enameled wire, and the capacitor is connected in parallel with the coil to reduce the resonance frequency of the coil itself, such that a low-frequency signal is amplified. Next, the amplifier is connected to the coil to amplify the signal. Finally, an analog electrical signal is converted, by the analog-to-digital converter, into the digital signal that can be processed by the computer. After the above devices are connected, the coil is placed near the loudspeaker. In this way, the magnetic field signal can be collected.

In Step S12, the collected magnetic field signal is converted into a speech signal, and the interference is removed from the speech signal to obtain a filtered speech signal.

Figure 3:
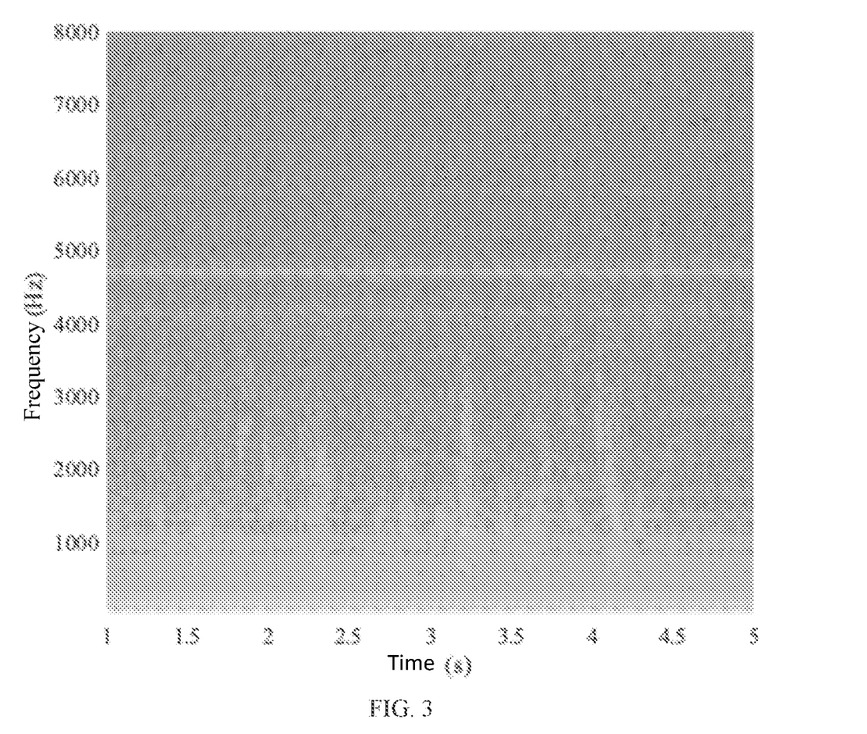
FIG. 3 is a schematic diagram showing effects of converting a magnetic field signal into an audio signal according to one embodiment of the present disclosure.

Specifically, first, the collected magnetic field signal is written into a WAV audio file at a sampling rate of 44,100 Hz, such that the collected magnetic field signal may be converted into a speech signal. FIG. 3 is a schematic diagram showing effects of converting the magnetic field signal into an audio signal.

Figure 4:
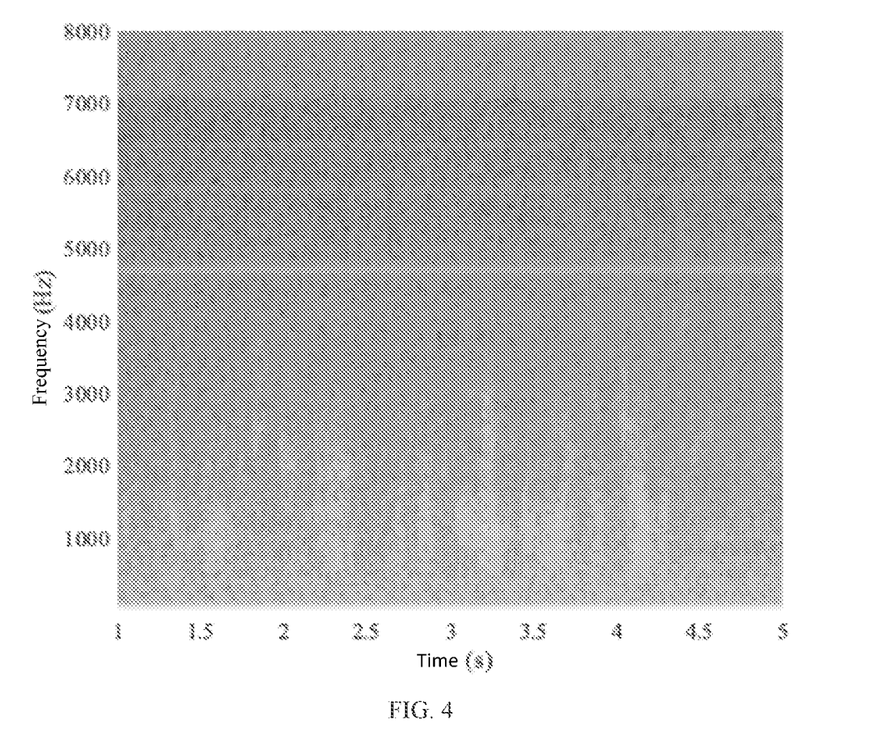
FIG. 4 is a schematic diagram showing effects of preprocessing a signal according to one embodiment of the present disclosure.

Next, frequency components of non-human speech in the collected signal are removed by using a Butterworth filter. For example, a band-pass filter with an upper cut-off frequency of 20 KHz and a lower cut-off frequency of 85 Hz is used for filter processing.

Next, DC components of 50 Hz and harmonic wave thereof are filtered out by using a notch filter to eliminate electromagnetic interferences caused by a power line. FIG. 4 is a schematic diagram showing effects of preprocessing the signal according to the above steps.

In Step S13, noises in the speech signal are removed.

Figure 5:
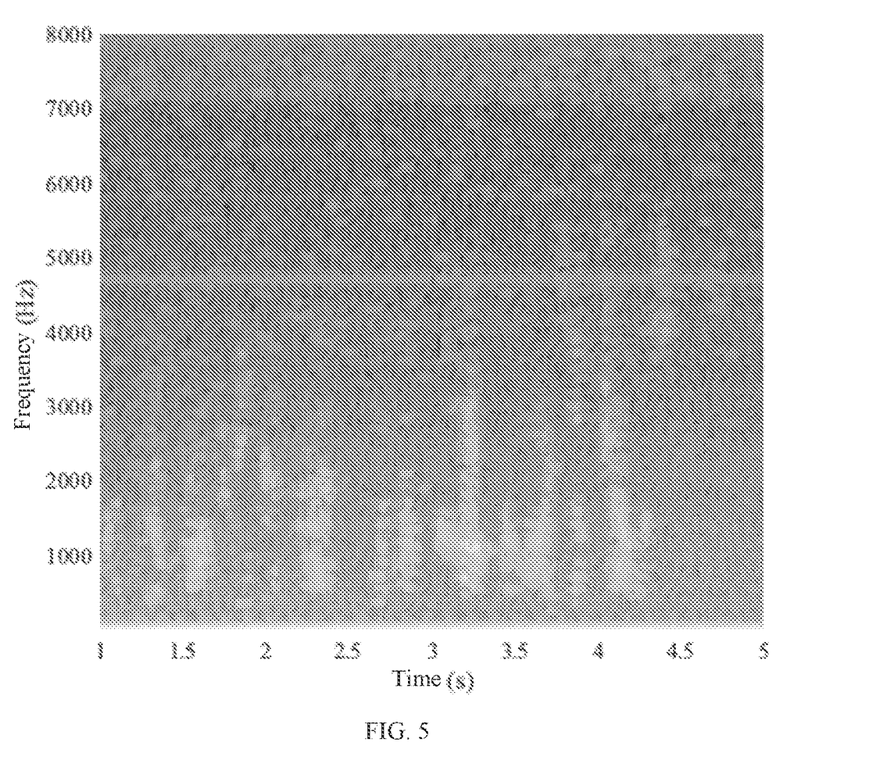
FIG. 5 is a schematic diagram showing effects of denoising a signal according to one embodiment of the present disclosure.

Preferably, the noises in the speech signal are removed based on spectral subtraction. According to the spectral subtraction, a noise power spectrum is calculated out during a quiet period at the beginning of the signal, and then the noise power spectrum is subtracted from a power spectrum of the original speech signal to obtain a pure speech power spectrum. Finally, a time-domain signal is recovered by performing short-time inverse Fourier transform on the pure speech power spectrum to obtain the denoised speech signal. Specific steps are as follows.

First, the speech signal preprocessed in Steps S1 and S2 is denoted as $Y(\omega)$, wherein this signal is composed of a noise signal $D(\omega)$ and a pure speech signal $X(\omega)$, i.e., $Y(\omega)=D(\omega)+X(\omega)$. In one embodiment, the first five frames of the signal are regarded as noise.

Next, the speech signal is divided into a plurality of frames, short-time Fourier transform is performed on each frame to calculate a signal-to-noise ratio (SNR) of the current frame, and then a power spectrum of the noise signal is subtracted from a power spectrum of the speech signal. A specific calculation formula is as below:

$$|X(\omega)|^2 = \begin{cases} |Y(\omega)|^2 - \alpha|D(\omega)|^2, & |Y(\omega)|^2 > (\alpha+\beta)|D(\omega)|^2 \\ \beta|D(\omega)|^2, & \text{for other} \end{cases} \quad (1)$$

wherein $\alpha$ represents an over-subtraction factor, $\beta$ represents a spectrum lower limit parameter, and the over-subtraction factor and the spectrum lower limit parameter are respectively configured for controlling a distortion degree of a speech spectrum and a size of a residual noise.

In one embodiment, the over-subtraction factor is set to $$\alpha = \begin{cases} 4 - \dfrac{3}{20}SNR, & -5 \le SNR \le 20 \\ 5, & SNR < -5 \\ 1, & SNR > 20 \end{cases},$$

wherein the SNR represents the signal-to-noise ratio of the current frame. The spectrum lower limit parameter $\beta$ is set to 0.02. This setting can effectively remove the noise in the speech signal.

A power spectrum of a pure speech signal may be obtained by subtracting the noise power spectrum from the power spectrum of the original signal. Next, a time-domain signal may be recovered by performing short-time inverse Fourier transform on this power spectrum signal. Finally, the denoised speech signal is recovered by recombining the time-domain signal according to a frame length and a frame shift length of the frame. FIG. 5 is a schematic diagram showing effects of denoising a signal based on spectral subtraction.

In Step S14, a response of the speech signal to each frequency is equalized.

Figure 6:
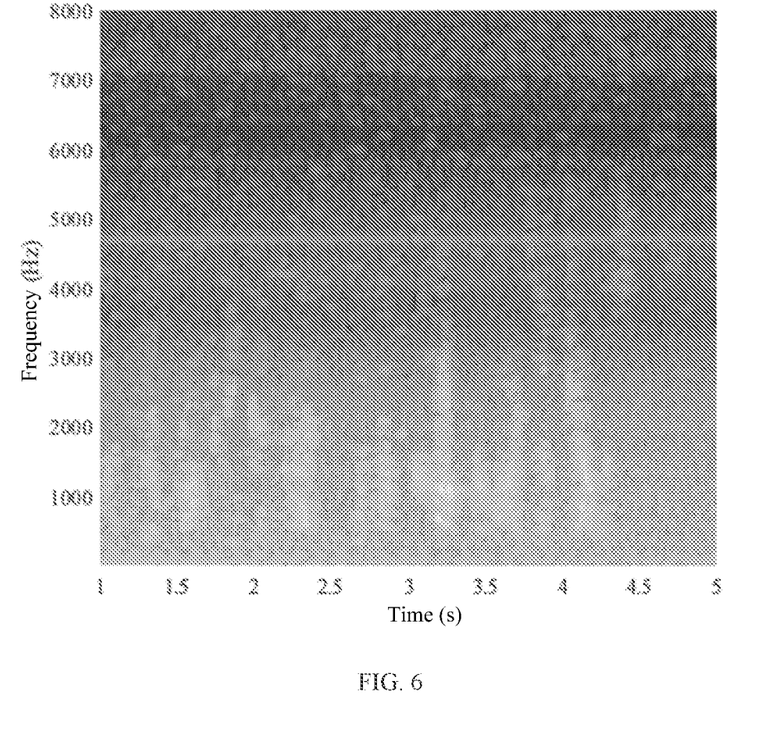
FIG. 6 is a schematic diagram showing effects of equalizing a signal according to one embodiment of the present disclosure.

Preferably, an unbalanced frequency response of the collected signal is compensated for by using an equalizer, such that a distorted speech signal may be restored to intelligible speech contents. Specifically, a 10-band equalizer is employed to amplify a gain of a low-frequency part of the signal and to reduce the gain of a high-frequency part of the signal. FIG. 6 is a schematic diagram showing effects of equalizing the signal.

In Step S15, the audio signal is converted into text contents.

In this Step S15, the processed speech signal may be converted into the text contents by using an existing speech-to-text conversion algorithm.

Figure 7:
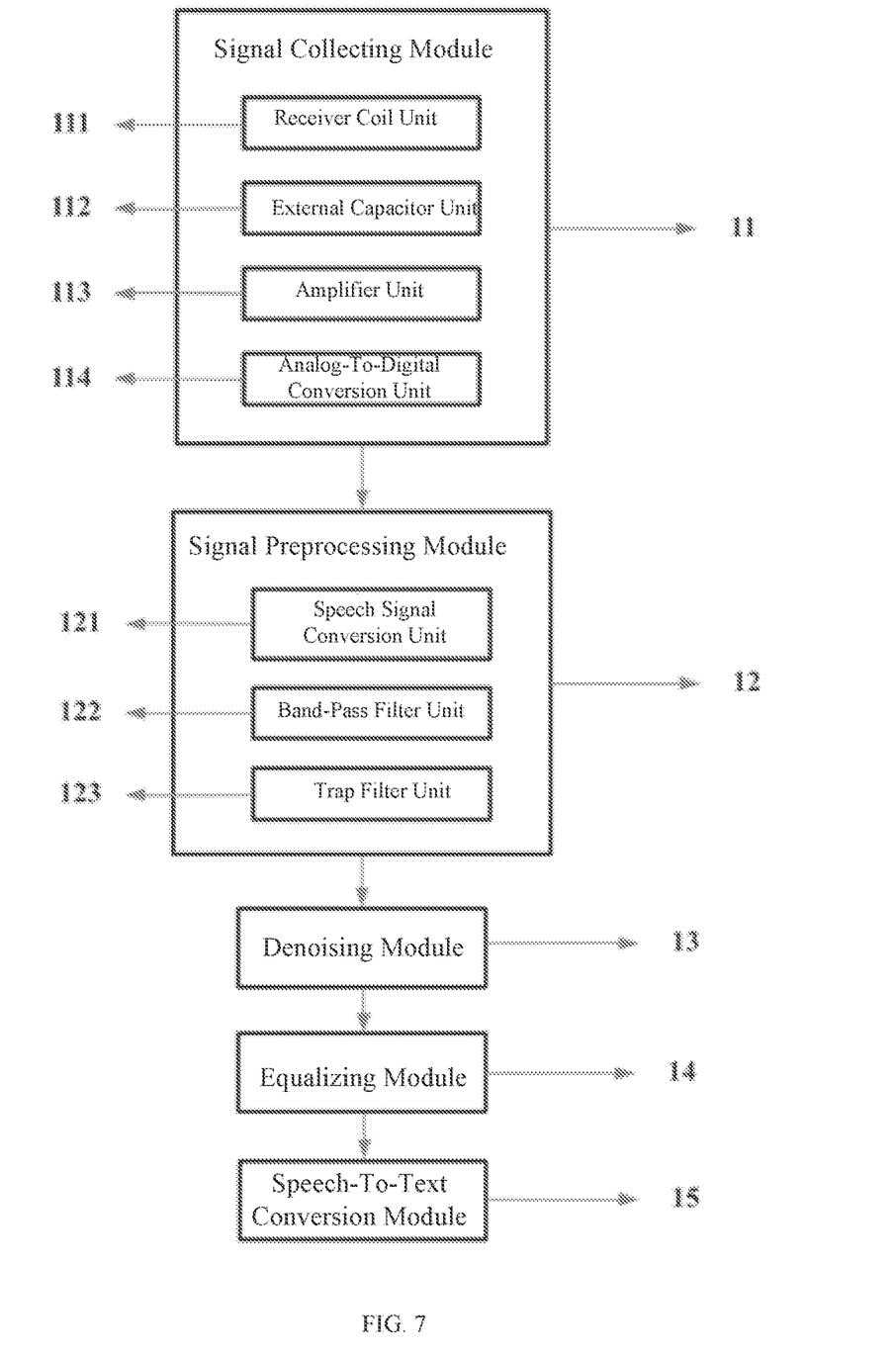
FIG. 7 is a schematic diagram of a monitoring system based on a magnetic field of a loudspeaker according to one embodiment of the present disclosure.

Correspondingly, the present disclosure also provides a monitoring system based on a magnetic field of a loudspeaker, which is configured to implement one or more aspects of the above method, and modules and units involved therein may be implemented by programmable logic devices or special purpose processors. For example, referring to FIG. 7, this system includes:

a signal collecting module 11, configured to collect a magnetic field signal near a loudspeaker, and convert the magnetic field signal into a digital signal, the digital signal being transmitted to a computer for processing;

a signal preprocessing module 12, configured to convert the magnetic field signal into a speech signal and remove a useless frequency component from the speech signal;

a denoising module 13, configured to remove noise in the speech signal by using a noise reduction algorithm;

an equalizing module 14, configured to compensate for a response of the denoised speech signal to each frequency through an equalizer; and a speech-to-text conversion module 15, configured to convert the processed speech signal into a text content.

In one embodiment, the signal collecting module 11 includes:

a receiver coil unit 111, configured to collect a magnetic field signal near the loudspeaker and convert the magnetic field signal into an induced voltage;

an external capacitor unit 112, configured to adjust a resonance frequency of a coil to increase a monitoring distance;

an amplifier unit 113, configured to amplify the induced voltage of the coil; and an analog-to-digital conversion unit 114, configured to convert an analog electrical signal into a digital signal that can be processed by a computer.

In one embodiment, the signal preprocessing module 12 includes:

a speech signal conversion unit 121, configured to convert the collected magnetic field signal into a speech signal for subsequent further processing;

a filter unit 122, configured to remove frequency components of non-human speech; and a notch filter unit 123, configured to remove interferences of a power line at 50 Hz and a harmonic wave thereof by using a plurality of notch filters.

To further verify the effects of the present disclosure, experiments are carried out. Experiments on a plurality of existing electronic devices with built-in loudspeakers have shown that speech contents played by smart mobile phones can be restored with an accuracy of 86% at a distance of 30 cm, and audios played by earphones can be restored with an accuracy of 86% at a distance of 25 cm. Furthermore, when a target device is obstructed by a concrete wall with a thickness of 25 cm, an accuracy of 80% can also be achieved.

It is to be noted that those skilled in the art may make appropriate changes or modifications to the above-mentioned embodiments without departing from the spirit and scope of the present disclosure, for example, setting different filter cut-off frequencies, or writing the collected magnetic field signal into WAV audio files at different sampling rates. The various parameter settings provided in the foregoing embodiments are preferred configurations that have been repeatedly verified, which can effectively improve the accuracy of speech recognition.

In summary, the present disclosure proposes a technical solution for restoring speech information based on the magnetic field signal from the loudspeaker, which can be successfully applied to different electronic devices with built-in loudspeakers, and can restore speech contents played by the electronic devices within a certain distance from the electronic devices. A hardware system of the present disclosure is small in size and easy for carry. Even if the target device is obstructed by the concrete wall, the speech information can be restored with a high accuracy.

The monitoring method and system provided by the present disclosure may be used for legal monitoring, and are applicable to various types of electronic devices with built-in loudspeakers, such as smart mobile phones, wearable devices and the like. According to the present disclosure, based on a magnetic field transforming near the loudspeaker, a model for conversion between the magnetic field signal and the speech signal is constructed, which can monitor, highly accurately on different occasions, audios played in different electronic devices with built-in loudspeakers. This novel monitoring method provides a new direction for the current monitoring technologies, and is applicable to the trend towards increasing diversification of electronic devices, and is proven to be convenient for practical applications.

The present disclosure may be a system, a method, and/or a computer program product. The computer program product may include a computer readable storage medium having computer readable program instructions thereon for causing a processor to carry out aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. The computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical fiber transmission, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++, Python or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In a scenario involved with the remote computer, the remote computer may be coupled to the user's computer through any type of network, including a local area network (LAN) or a wide area network (WAN), or may be coupled to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described with reference to flowcharts and/or block diagrams according to the method, apparatus (system) and a computer program product of the embodiments of the present disclosure. It is to be understood that each block of the flowcharts and/or block diagrams, and combinations of blocks in the flowcharts and/or block diagrams, can be implemented by the computer readable program instructions.

These computer readable program instructions may be provided to a processor of a general purpose computer, special purpose computer, or other programmable data processing apparatus to produce a machine, such that these instructions, which execute via the processor of the computer or other programmable data processing apparatus, create means for implementing the functions/acts specified in one or more blocks in the flowcharts and/or block diagrams. These computer readable program instructions may also be stored in a computer readable storage medium that can direct a computer, a programmable data processing apparatus, and/or other devices to function in a particular manner, such that the computer readable medium having instructions stored therein includes an article of manufacture including instructions which implement aspects of the functions/acts specified in one or more blocks in the flowcharts and/or block diagrams.

The computer readable program instructions may also be loaded onto a computer, other programmable data processing apparatus, or other devices to cause a series of operational steps to be performed on the computer, other programmable apparatus or other devices to produce a computer implemented process, such that the instructions which execute on the computer, other programmable apparatus, or other devices implement the functions/acts specified in one or more blocks in the flowcharts and/or block diagrams.

The flowcharts and block diagrams in the accompanying drawings illustrate architectures, functions and operations of possible implementations of systems, methods, and computer program products according to a plurality of embodiments of the present disclosure. In this regard, each block in the flowcharts or block diagrams may represent a module, a program segment, or a portion of instructions, which includes one or more executable instructions for implementing the specified logical function(s). In some alternative implementations, the functions denoted by the blocks may occur in a sequence different from the sequences shown in the accompanying drawings. For example, two blocks shown in succession may, in fact, be executed substantially concurrently, or the blocks may sometimes be executed in a reverse sequence, depending upon the functions involved. It is also to be noted that each block in the block diagrams and/or flowcharts and/or a combination of the blocks in the block diagrams and/or flowcharts may be implemented by a special-purpose hardware-based system executing specific functions or acts, or by a combination of a special-purpose hardware and computer instructions. It is well known to those skilled in the art that implementations by means of hardware, implementations by means of software and implementations by means of software in combination with hardware are equivalent.

The descriptions of the various embodiments of the present disclosure have been presented above for purposes of illustration, but are not intended to be exhaustive or limited to the embodiments disclosed. Therefore, it is apparent to an ordinary skilled person in the art that modifications and variations could be made without departing from the scope and spirit of the embodiments. The terminology used herein is chosen to best explain the principles of the embodiments, the practical application or technical improvement over technologies found in the marketplace, or to enable others of ordinary skill in the art to understand the embodiments disclosed herein. The scope of the present disclosure is limited by the appended claims.

What is claimed is:

1. A monitoring method based on a magnetic field of a loudspeaker, comprising:
    S1: collecting a magnetic field signal near the loudspeaker, and converting the magnetic field signal into a magnetic field digital signal;
    S2: converting the magnetic field digital signal into a speech signal and removing an interference from the speech signal to obtain a filtered speech signal;
    S3: removing noise in the filtered speech signal, and performing a short-time inverse Fourier transform on a speech power spectrum to obtain a denoised speech signal;

S4: equalizing a response of the denoised speech signal to each frequency to convert the denoised speech signal into an intelligible speech audio signal; and S5: recognizing the intelligible speech audio signal and converting the intelligible speech audio signal into a text content.

2. The monitoring method according to claim 1, wherein in step S1,
a signal collection apparatus is employed to collect the magnetic field signal near the loudspeaker,
wherein the signal collection apparatus comprises a receiver coil unit, an external capacitor unit, an amplifier unit, and an analog-to-digital conversion unit,
wherein the receiver coil unit is configured to collect the magnetic field signal near the loudspeaker, and convert the magnetic field signal into an induced voltage;
the external capacitor unit is configured to connect in parallel with the receiver coil unit to adjust a resonance frequency of a coil of the receiver coil unit;
the amplifier unit is configured to amplify the magnetic field signal collected; and
the analog-to-digital conversion unit is configured to convert an analog electrical signal into a digital signal.

3. The monitoring method according to claim 1, wherein step S2 comprises:
storing the magnetic field digital signal collected into an audio file at a preset sampling rate to convert the magnetic field digital signal into the speech signal;
removing a frequency component of non-human speech in the speech signal by means of a band-pass filter; and
filtering out DC components of a preset frequency and a harmonic wave of the speech signal by means of a notch filter.

4. The monitoring method according to claim 3, wherein the preset sampling rate is 44,100 Hz,
the band-pass filter is a Butterworth filter, wherein an upper cut-off frequency is set to 20 KHz, a lower cut-off frequency is set to 85 Hz, and
the notch filter is configured to filter out the DC components of the preset frequency of 50 Hz and the harmonic wave of the speech signal.

5. The monitoring method according to claim 1, wherein in step S3, the step of removing the noise in the filtered speech signal based on a spectral subtraction comprises:
recognizing a duration of the noise in the filtered speech signal, and calculating a corresponding noise power spectrum;
subtracting the corresponding noise power spectrum from a power spectrum of the filtered speech signal to obtain a pure speech power spectrum; and
recovering a time-domain signal by performing the short-time inverse Fourier transform on the pure speech power spectrum to obtain the denoised speech signal.

6. The monitoring method according to claim 5, wherein a calculation process of the step of subtracting the corresponding noise power spectrum from the power spectrum of the filtered speech signal to obtain the pure speech power spectrum is expressed as:

$$|X(\omega)|^2 = \begin{cases} |Y(\omega)|^2 - \alpha|D(\omega)|^2, & |Y(\omega)|^2 > (\alpha+\beta)|D(\omega)|^2 \\ \beta|D(\omega)|^2, & \text{for other} \end{cases},$$

wherein $\alpha$ represents an over-subtraction factor, $\beta$ represents a spectrum lower limit parameter, wherein the over-subtraction factor and the spectrum lower limit parameter are respectively configured for controlling a distortion degree of a speech spectrum and a size of a residual noise,
$Y(\omega)$ represents the filtered speech signal,
$D(\omega)$ represents a noise signal, and
$X(\omega)$ represents a pure speech signal.

7. The monitoring method according to claim 6, wherein the spectrum lower limit parameter $\beta$ is set to 0.02, and the over-subtraction factor $\alpha$ is set to:

$$\alpha = \begin{cases} 4 - \dfrac{3}{20}SNR, & -5 \leq SNR \leq 20 \\ 5 & SNR < -5 \\ 1 & SNR > 20 \end{cases},$$

wherein SNR represents a signal-to-noise ratio of a current frame.

8. The monitoring method according to claim 1, wherein in step S4, an equalizer is configured to compensate for the response of the denoised speech signal to the each frequency, such that a distorted speech signal is restored to an intelligible speech content.

9. A monitoring system based on a magnetic field of a loudspeaker, comprising:
a signal collecting module, configured to collect a magnetic field signal near the loudspeaker, and convert the magnetic field signal into a magnetic field digital signal, wherein the magnetic field digital signal is transmitted to a computer for processing;
a signal preprocessing module, configured to convert the magnetic field digital signal into a speech signal and remove an interference from the magnetic field speech signal to obtain a filtered speech signal;
a denoising module, configured to remove noise in the filtered speech signal, and perform a short-time inverse Fourier transform on a speech power spectrum to obtain a denoised speech signal;
an equalizing module, configured to equalize a response of the denoised speech signal to each frequency to convert the denoised speech signal into an intelligible speech audio signal; and
a speech-to-text conversion module, configured to recognize the intelligible speech audio signal and convert the intelligible speech audio signal into a text content.

10. A computer-readable storage medium, wherein a computer program is stored in the computer-readable storage medium, and the computer program is executable by a processor, whereby steps of the method according to claim 1 are implemented.

* * * * *